INVENTOR.
ALBERT R. OSBURN
BY Edwin D. Grant
ATTORNEY

United States Patent Office 3,427,805
Patented Feb. 18, 1969

3,427,805
COMBUSTION BARRIER FOR ROCKET MOTOR
Albert R. Osburn, Brigham City, Utah, assignor to Thiokol Chemical Corporation, Bristol, Pa., a corporation of Delaware
Filed Nov. 29, 1966, Ser. No. 597,768
U.S. Cl. 60—39.47
Int. Cl. F02k 9/04; F42b 1/00, 15/00
4 Claims

ABSTRACT OF THE DISCLOSURE

A solid propellant rocket motor having incorporated within the grain thereof means for varying the burning pattern of said grains comprising combustion barriers embedded therein in various positions depending upon the desired burning pattern.

---

This invention relates to solid propellant rockets and more particularly to means for varying the burning pattern of a solid propellant grain of a rocket motor.

All of the grain designs heretofore proposed for varying the thrust produced by a solid propellant rocket motor during its operating period are highly complicated in structure and geometry and hence expensive to manufacture. Hence, alteration of said grains to produce varying rocket motor performance requires costly redesign of both the rocket motor grain and associated tooling and manufacturing hardware. The present invention provides means for varying the burning pattern, or rate of generation of combustion products, of an existing solid propellant grain design. Further, this invention permits the rapid and economical achievement of a variety of burning patterns from simple, easy to manufacture, basic grain configurations. Therefore, the invention makes it possible to adapt an uncomplicated, readily manufactured solid propellant grain for different rocket mission requirements. This advantageous result is achieved by means of combustion barriers imbedded in the solid propellant grain, said combustion barriers being formed of a heat resistant member which, in one embodiment of the invention, is disposed radial to the longitudinal axis of a rocket motor and which, in a second embodiment of the invention, is disposed concentric with the longitudinal axis of a rocket motor.

It is accordingly an object of this invention to provide means for varying the rate of generation of combustion products in a solid propellant rocket motor.

Another object of this invention is to provide uncomplicated and effective means for varying the thrust pattern of a solid propellant rocket motor.

An additional object of this invention is to provide inexpensive, readily manufactured means for varying the burning surface area of a solid propellant grain during the combustion thereof.

Other objects and advantages of the present invention will become apparent in the following specification thereof, in which reference is made to the accompanying drawings, wherein.

Throughout the specification and in the drawings, like numbers designate like parts.

Figure 1:
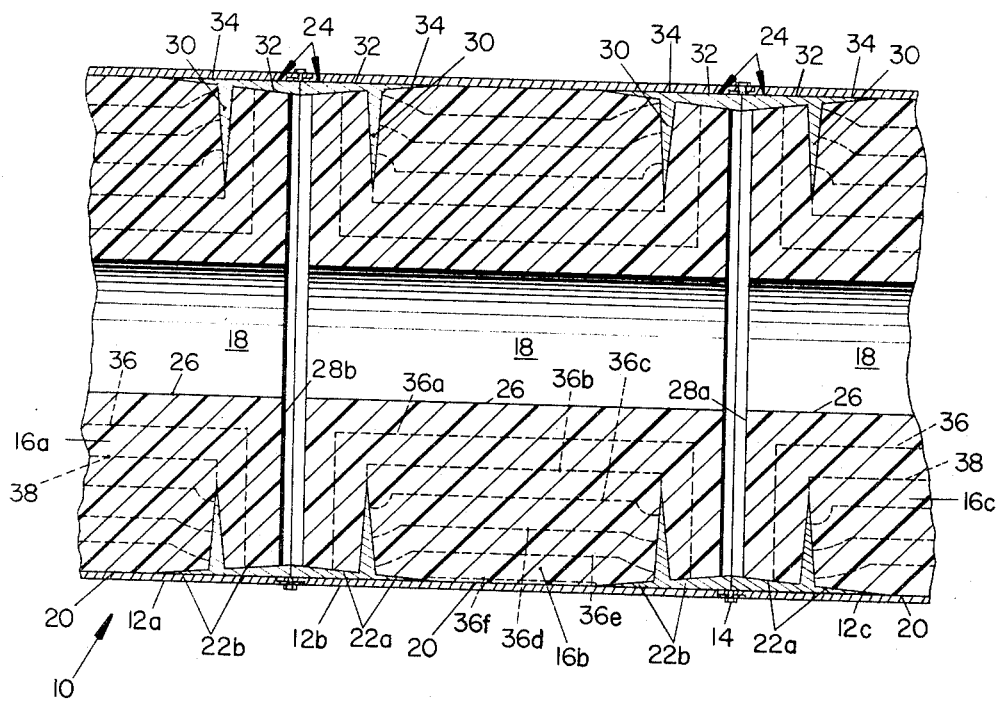
FIGURE 1 is a fragmentary sectional view taken along the longitudinal axis of a rocket motor in which combustion barriers constituting a first preferred form of the invention are utilized.

In FIG. 1 reference number 10 generally designated the casing of a rocket motor, said casing comprising three cylindrical sections 12a, 12b, 12c which are fixedly joined together by a plurality of screws 14. Disposed within each section of casing 10 is a solid propellant grain 16a, 16b, 16c having a cylindrical, centrally located, longitudinally extending perforation 18 formed therein. The middle portion 20 of the peripheral surface of each grain 16a, 16b, 16c is bonded by a suitable liner material (not shown) to the inner surface of its section of casing 10, and each of the two edge portions 22a, 22b of said peripheral surface is bonded to a combustion barrier each of which is generally designated by reference number 24 and is identical in shape and size in the preferred embodiment of the invention herein described. Grains 16a, 16b, 16c are spaced apart longitudinally of casing 10, and thus each of said grains has an internal, longitudinally extending burning surface 26 and a burning surface 28a, 28b at each end thereof.

Each combustion barrier 24 extends circumferentially of casing 10 and includes a first portion 30 which is embedded in, and bonded to, the particular grain 16a, 16b, 16c with which said combustion barrier is associated, said first portion 30 being disposed perpendicular to the longitudinal axis of said casing. The thickness of portion 30 of each combustion barrier 24 may decrease inwardly of casing 10 so that said portion has the illustrated tapered cross-section. Each combustion barrier 24 also includes a second integral portion 32 which is disposed between casing 10 and the particular grain with which said combustion barrier is associated, and which extends between portion 30 of said combustion barrier and the adjacent one of said burning surfaces 28a, 28b at the ends of said grain. Preferably portion 32 of each combustion barrier 24 projects a short distance from the adjacent surface 28a or 28b and, as can be seen in the drawing, the combustion barriers associated with grain 16b respectively contact the adjacent combustion barriers in grains 16a and 16b so that the wall of casing 10 between said grains is insulated by said barriers. Furthermore, each combustion barrier 24 includes a third integral portion 34 which is disposed between casing 10 and the particular grain with which said combustion barrier is associated, and which projects from the other side of portion 30 thereof.

Grains 16a, 16b, 16c can be formed of many different solid propellants which are well-known in the art. In the preferred embodiment of the invention that is herein described and illustrated, combustion barriers 24 are made of a heat-resistant material, namely, a combustion-inhibiting composition comprising approximately by weight, carboxyl-terminated polybutadiene polymer, 46.7%; trifunctional epoxy resin, 1.0%; carbon black (powder), 49.0%; tris(1-(2-methyl)aziridinal)phosphine oxide, 1.4%; triglyceride of hydroxy stearic acid, 1.0%; and iron octoate, 0.9%. However, in some applications of the invention, it is advantageous to form the combustion barriers of other materials, such as, for example, a solid propellant having a lower burning rate than that of the grain, or grains, with which said combustion barriers are utilized.

A conventional igniter (not shown) can be used to ignite one or more surfaces of the grains 16a, 16b, 16c after which the flame of combustion thereof will rapidly ignite the other surfaces of said grains. The broken lines designated by reference number 36 in the drawing represent the positions of the longitudinally extending burning surface 26 and end burning surfaces 28a, 28b of each grain 16a, 16b, 16c at different states during the combustion of said grains. Thus reference number 36a designates the positions of said burning surfaces a short time after the grains are ignited, and it will be seen that at this stage of the burning pattern of said grains, the end burning surfaces 28a, 28b and the longitudinally extending burning surface 26 of each grain have moved approximately equal distances from their initial positions. However, portion 30 of each combustion barrier 24 is so disposed that when the flame front of the end burning surfaces 28a, 28b of the grains reaches said portion 30 the position of the longitudinally extending burning surface 26 is still a short distance from the inner edge of said portion 30, as indicated in the drawing by the broken line 36b. Thus, when the propellant overlying portion 32 of each combustion barrier has been consumed, there are small residual burning surfaces at the ends of each grain 16a, 16b, 16c.

The high-temperature gas which is generated by combustion of the grains thereafter burns around the inner edge of portion 30 of each combustion barrier. Consequently, a curved burning surface forms adjacent portion 30 of each combustion barrier 34 as the longitudinally extending burning surfaces of the grains moves radially out toward casing 10. By inspection of the broken lines 36c, 36d, 36e, which delineate successive positions of the burning surfaces of the grains after the flame front has reached the propellant disposed between portions 30 of the two combustion barriers associated with each of said grains, it will be seen that the aforementioned curved burning surfaces become larger as combustion of the grains proceeds. Thus, there is a gradual, rather than abrupt, transition between burning which occurs at both longitudinally extending and radially extending surfaces of each of the grains 16a, 16b, 16c and burning which occurs at only a longitudinally extending surface thereof, such as occurs immediately before the flame front reaches casing 10, as represented by the broken lines 36f.

It will also be recognized that the tapered cross-section of portions 32 and 34 of each combustion barrier provides the greatest thickness of insulation for protection of casing 10 at the points on said portions 32 and 34 which are exposed for the longest time to the high temperature products of combustion of grains 16a, 16b, 16c.

By varying the distance between portion 30 of each combustion barrier 24 and the initial end burning surfaces 28a, 28b of the grains 16a, 16b, 16c, or by varying the distance between the inner edge of said portion 30 of each combustion barrier and the initial longitudinally extending burning surfaces 26 of said grains, or by varying both of these distances, it is possible to vary substantially the burning pattern of said grains. In some rocket motors, it is also advantageous to utilize only one combustion barrier 24 at a point adjacent one end burning surface of a centrally perforated grain, and the invention is of course not limited with respect to the number of grains employed in the described embodiment of the invention or the initial configuration of said grains. It will be recognized by those skilled in the art of rocket motors that a double end burning, centrally perforated grain with which the invention is utilized can readily be manufactured with two circumferentially extending grooves extending radially from the peripheral surface thereof to receive the portion 30 of the combustion barriers 24, or a grain of the desired size and shape can be cast in a rocket motor casing on the inner surface of which said combustion barriers have previously been bonded.

Figure 2:
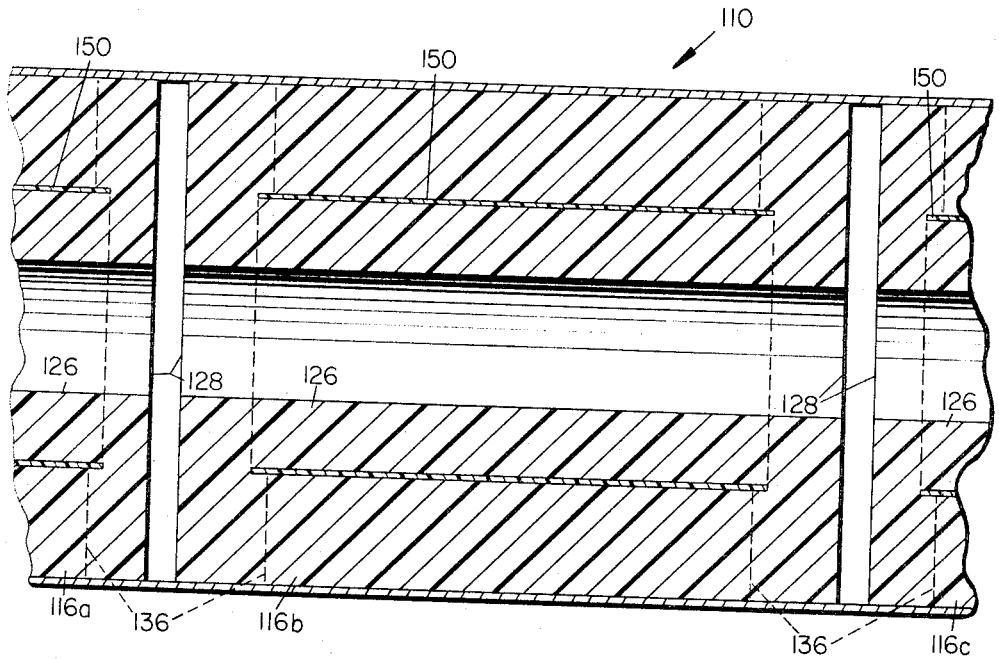
FIGURE 2 is a fragmentary sectional view taken along the longitudinal axis of a rocket motor in which combustion bariers constituting a second preferred form of the invention are utilized.

In FIGURE 2 is illustrated a section of a rocket motor casing 110 containing three longitudinally spaced solid propellant grains 116a, 116b, 116c in each of which is a combustion barrier 150 constituting a second embodiment of this invention. More specifically, each combustion barrier 150 is a cylindrical band of heat-resistant material embedded in a respective one of the grains 116a, 116b, 116c and concentric with the cylindrical, longitudinally extending internal burning surface 126 thereof. The ends of the combustion barriers are equidistant from the end burning surfaces 128 of the respective grains 116a, 116b, 116c. When the grains are ignited, their longitudinally extending burning surfaces 126 move outwardly toward combustion barriers 150 while their end burning surfaces 128 move longitudinally of casing 110 toward the ends of said combustion barriers. The longitudinally extending surfaces 126 and end burning surfaces 128 reach the combustion barriers simultaneously, after which burning continues longitudinally of casing 110 as illustrated by the broken lines 136. Thus the second embodiment of the invention provides for initial burning of each grain 116 along both a longitudinally extending surface and two end burning surfaces, followed by burning along two end burning surfaces only, whereas the first embodiment of the invention provides for initial burning of each grain 16 along both a longitudinally extending surface and two end burning surfaces, followed by burning along a longitudinally extending surface only.

Figure 3:
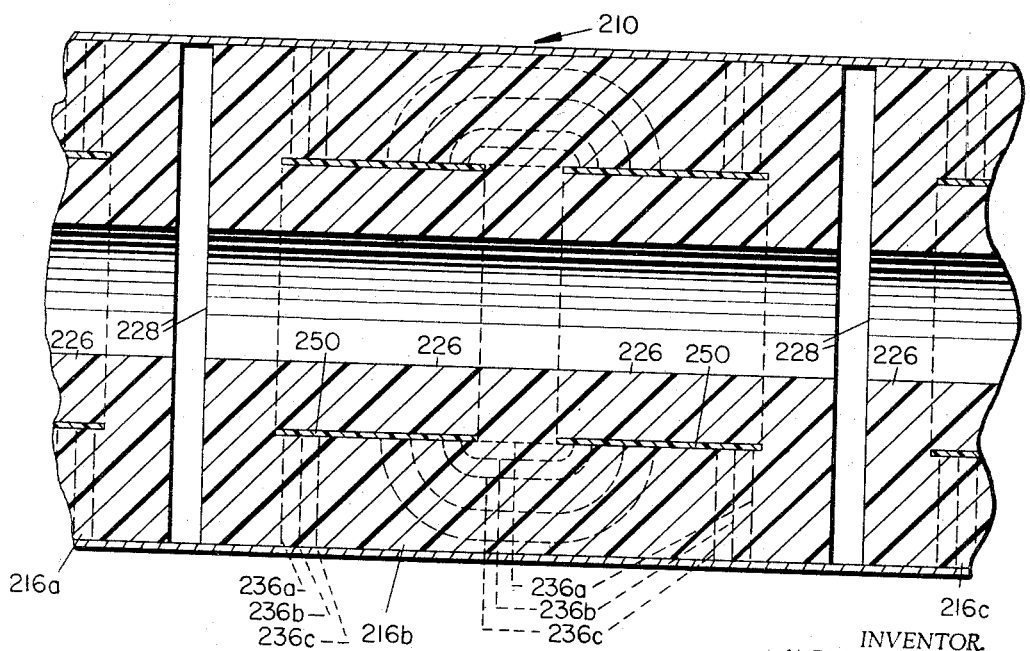
FIGURE 3 is a fragmentary sectional view taken along the longitudinal axis of a rocket motor in which combustion barriers constituting still another preferred form of the invention are utilized.

In FIGURE 3 is illustrated a section of a rocket motor casing 210 containing three longitudinally spaced solid propellant grains 216a, 216b, 216c in each of which are two combustion barriers 250 constituting a third embodiment of this invention. As in the above-described second embodiment of the invention, each combustion barrier 250 is a band of heat-resistant material embedded in a respective one of the grains 216a, 216b, 216c and concentric with the cylindrical, longitudinally extending internal burning surface 226 thereof. More specifically, the combustion barriers of each grain are equidistant from the longitudinally burning surface and end burning surfaces thereof, and there is a gap between the adjacent ends of the combustion barriers. When the grains are ignited, their longitudinally extending burning surfaces 226 move outwardly toward combustion barriers 250 while their end burning surfaces 228 move longitudinally of casing 210 toward the end of the adjacent one of said combustion barriers. The longitudinally extending surfaces 226 and end burning surfaces 228 reach the combustion barriers simultaneously, after which burning proceeds as illustrated by the broken lines 236a, 236b, 236c. After the burning surface between the adjacent ends of the combustion barriers 250 reaches the wall of casing 210, burning occurs longitudinally of said casing at four surfaces.

It will be recognized that by proper spacing of the combustion barriers 150, 250 within grains 116, 216, respectively, many different burning patterns of the grains can be achieved. Obviously, more than two combustion barriers of the type illustrated in FIGURE 3 can be disposed in spaced, tandem relation within a solid propellant grain having a longitudinally extending and two end burning surfaces. Therefore, the scope of the invention is to be understood as limited only by the terms of the appended claims.

What is claimed is:

1. In a rocket motor having a tubular casing and at least one solid propellant grain disposed within said casing and provided with a cylindrical, longitudinally extending internal burning surface and a burning surface at each end thereof, means for varying the burning pattern of said grain comprising a cylindrical band embedded in said grain and concentric with said internal burning surface thereof, the ends of said band being spaced from the ends of said grain.

2. Means for varying the burning pattern of a solid propellant grain as defined in claim 1 wherein said band is formed of a heat-resistant material.

3. Means for varying the burning pattern of a solid propellant grain as defined in claim 1 wherein said band is formed of a solid propellant having a lower burning rate than that of said grain.

4. In a rocket motor having a tubular casing and at least one solid propellant grain disposed within said casing and provided with a cylindrical, longitudinally extending internal burning surface and a burning surface at each end thereof, means for varying the burning pattern of said grain comprising at least two cylindrical bands embedded in said grain and concentrical with said internal burning surface thereof, said bands being spaced apart longitudinally of said casing and spaced from the ends of said grain.

References Cited

UNITED STATES PATENTS

| | | | |
|---|---|---|---|
| 3,017,743 | 1/1962 | Adelman | 60—39.47 XR |
| 3,120,737 | 2/1964 | Holloway | 60—254 XR |
| 3,137,126 | 6/1964 | Madison | 60—253 XR |
| 3,170,291 | 2/1965 | Adelman | 60—39.47 XR |
| 3,248,875 | 5/1966 | Wolcott | 60—254 |
| 3,292,545 | 12/1966 | Matsubara | 102—101 |
| 3,362,159 | 1/1968 | Heesacker | 60—253 XR |

CARLTON R. CROYLE, *Primary Examiner.*

U.S. Cl. X.R.

60—253; 102—102, 103